United States Patent
Lin et al.

(10) Patent No.: US 9,898,676 B2
(45) Date of Patent: Feb. 20, 2018

(54) METHOD FOR DETERMINING THE LEVEL OF DEGRADATION OF A ROAD MARKING

(71) Applicant: I-SHOU UNIVERSITY, Kaohsiung (TW)

(72) Inventors: Kuo-Liang Lin, Kaohsiung (TW); Jyh-Bin Suen, Kaohsiung (TW)

(73) Assignee: I-SHOU UNIVERSITY, Kaohsiung (TW)

(*) Notice: Subject to any disclaimer, the term of this patent is extended or adjusted under 35 U.S.C. 154(b) by 137 days.

(21) Appl. No.: 14/994,663

(22) Filed: Jan. 13, 2016

(65) Prior Publication Data

US 2017/0200058 A1    Jul. 13, 2017

(51) Int. Cl.
| | |
|---|---|
| G06K 9/00 | (2006.01) |
| G06K 9/32 | (2006.01) |
| G06T 7/40 | (2017.01) |
| H04N 5/28 | (2006.01) |
| H04N 5/235 | (2006.01) |

(52) U.S. Cl.
CPC .......... G06K 9/3241 (2013.01); G06T 7/408 (2013.01); H04N 5/2353 (2013.01); H04N 5/28 (2013.01)

(58) Field of Classification Search
USPC .......... 348/218.1, 221.1, 148; 382/104, 108, 382/112, 145, 209; 396/228
See application file for complete search history.

(56) References Cited

U.S. PATENT DOCUMENTS

| | | | | |
|---|---|---|---|---|
| 4,077,043 A | * | 2/1978 | Nanba | G03B 7/083 396/228 |
| 7,079,668 B2 | * | 7/2006 | Kogure | B60Q 9/008 382/104 |
| 7,092,571 B2 | * | 8/2006 | Hsieh | G06K 9/6203 382/209 |

(Continued)

FOREIGN PATENT DOCUMENTS

| | | |
|---|---|---|
| TW | 311319 B | 7/1997 |
| TW | 595214 B | 6/2004 |
| TW | 201211348 A | 3/2012 |

OTHER PUBLICATIONS

English abstract of Taiwan Patent No. 311319.
English abstract of Taiwan Patent No. 595214.

*Primary Examiner* — Xuemei Chen
(74) *Attorney, Agent, or Firm* — WPAT, PC

(57) ABSTRACT

A method for determining a level of degradation of a road marking is executed by a determination unit. The method includes generating a plurality of reference images by an image capturing device photographing a reference road marking with a plurality of shutter speeds. The reference images are stored in a database. The method further includes generating an image by the image capturing device photographing an examined road marking according to a selected shutter speed, retrieving one of the reference data from the database that has the same shutter speed as the examined road marking by a processor, and performing a difference determination procedure between the retrieved reference data and the examined data by the processor, and outputting a determined result of the level of degradation of the examined road marking by the processor. As such, accurate determination on the level of degradation of the examined road marking can be achieved.

7 Claims, 2 Drawing Sheets

(56) References Cited

U.S. PATENT DOCUMENTS

| | | | | |
|---|---|---|---|---|
| 7,202,902 B2* | 4/2007 | Miura | .................. | H04N 5/2354 |
| | | | | 348/362 |
| 7,679,651 B2* | 3/2010 | Tsunoda | ............. | H04N 5/23293 |
| | | | | 348/218.1 |
| 8,094,203 B2* | 1/2012 | Iwamoto | .............. | H04N 5/2353 |
| | | | | 348/221.1 |
| 8,144,231 B2* | 3/2012 | Miyashita | .......... | H04N 5/23293 |
| | | | | 348/231.6 |
| 8,736,748 B2* | 5/2014 | Takita | .................... | H04N 5/238 |
| | | | | 348/221.1 |
| 9,386,232 B2* | 7/2016 | Makino | ................ | H04N 5/2355 |
| 9,633,287 B2* | 4/2017 | Kawabata | ............ | G06K 15/025 |
| 2008/0024606 A1* | 1/2008 | Kawasaki | ................ | G03B 7/08 |
| | | | | 348/148 |
| 2008/0205746 A1* | 8/2008 | Ko | .................... | G01N 21/95607 |
| | | | | 382/145 |
| 2012/0121139 A1* | 5/2012 | Kojima | ............... | B41F 33/0036 |
| | | | | 382/112 |
| 2012/0300074 A1* | 11/2012 | Hasegawa | ............. | H04N 5/235 |
| | | | | 348/148 |
| 2014/0334689 A1* | 11/2014 | Butler | ..................... | G06T 7/001 |
| | | | | 382/108 |
| 2015/0371094 A1* | 12/2015 | Gardiner | ................ | E01C 23/01 |
| | | | | 348/148 |

* cited by examiner

METHOD FOR DETERMINING THE LEVEL OF DEGRADATION OF A ROAD MARKING

BACKGROUND OF THE INVENTION

1. Field of the Invention

The present disclosure generally relates to a method for determining the level of degradation of a road marking and, more particularly, to a method that determines the level of degradation of the road marking via a reference data that is selected for comparison purpose according to the shutter speed.

2. Description of the Related Art

Road markings are used on paved roadways to provide guidance and information to drivers and pedestrians. When the road markings degrade, the road markings are not able to provide proper guidance for the drivers and pedestrians. In a worst case, it can raise the safety issue.

When the road markings become shabby or start to peel off, the government will renovate the road markings in order to improve the safety of the drivers and pedestrians. Before the renovation of the road markings, the level of degradation of the road markings should be examined. In this regard, an image capturing device is used to capture the image of a road marking and generates a real image of the road marking. Then, the real image is compared with a reference image to determine whether the road marking is in a condition that needs the renovation.

To provide a sharp image of the road marking, the image capturing device usually photographs the road marking with a proper shutter speed based on the light intensity of the environment, so as to properly expose the image. Therefore, the real image of the road marking is captured at a different shutter speed according to the light intensity of the environment. However, since the reference image is often captured at a single shutter speed, if the real image and the reference image have different shutter speeds, the comparison between the real image and the reference image is not objective. This leads to an inaccurate determination on the level of degradation of the road marking.

In light of the deficiency, it is necessary to provide a method for determining the level of degradation of the road marking.

SUMMARY OF THE INVENTION

It is therefore the objective of this disclosure to provide a method for determining the level of degradation of the road marking in which the image comparison is made based on the same shutter speed of the compared data. As such, an accurate determination on the level of degradation of the road marking can be attained.

In an embodiment of the disclosure, a method for determining a level of degradation of a road marking is disclosed. The method is executed by a determination unit including a processor, a database, and an image capturing device having a plurality of shutter speeds. The method includes generating a plurality of reference images of a reference road marking by the image capturing device photographing the reference road marking with each of the plurality of shutter speeds, selecting a reference calculation area from each of the plurality of reference images by the processor, generating a plurality of reference data by the processor performing a first image analysis procedure on the reference calculation area of each of the plurality of reference images, storing the plurality of reference data in the database by the processor, generating an image of an examined road marking by the image capturing device selecting one of the plurality of shutter speeds according to a light intensity of an environment and photographing the examined road marking using the selected shutter speed, selecting a target calculation area from the image of the examined road marking by the processor, generating an examined data by the processor performing a second image analysis procedure on the target calculation area of the image of the examined road marking, retrieving one of the plurality of reference data from the database that has a same one of the plurality of shutter speeds as the selected shutter speed of the examined road marking, determining a color difference between the retrieved reference data and the examined data by the processor performing a difference determination procedure between the retrieved reference data and the examined data, and outputting a determined result of the level of degradation of the examined road marking according to the color difference. As such, accurate determination on the level of degradation of the examined road marking can be achieved.

In a form shown, performing the first image analysis procedure includes calculating an average color value of a plurality of pixels of the reference calculation area by the processor, and defining the average color values of the reference calculation areas of the plurality of reference images as a plurality of reference color values by the processor. The plurality of reference color values is the plurality of reference data. As such, accurate determination on the level of degradation of the examined road marking can be achieved.

In the form shown, performing the second image analysis procedure includes analyzing a color value of each of a plurality of pixels of the target calculation area by the processor, and defining the color values of the plurality of pixels of the target calculation area as a plurality of target color values by the processor. The examined data includes the plurality of target color values. As such, accurate determination on the level of degradation of the examined road marking can be achieved.

In the form shown, the retrieved reference data corresponds to one of the plurality of reference color values. In this regard, performing the difference determination procedure includes calculating a color difference between the one of the plurality of reference color values and each of the plurality of target color values by the processor, generating a total difference value by the processor adding the color differences of the plurality of target color values, generating an average difference value by the processor dividing the total difference value by a quantity of the plurality of target color values, and defining the average difference value as the determined result of the level of degradation of the examined road marking by the processor. As such, when the examined road marking degrades due to color fading, the accurate determination on the level of degradation of the examined road marking can be achieved.

In the form shown, the retrieved reference data corresponds to one of the plurality of reference color values. In this regard, performing the difference determination procedure includes calculating a color difference between the one of the plurality of reference color values and each of the plurality of target color values by the processor, determining whether the color difference is larger than a threshold value by the processor, calculating a quantity of the color differences of the plurality of target color values that are larger than the threshold value by the processor, and determining a ratio between the quantity and a quantity of the plurality of target color values by the processor. The ratio is the determined result of the level of degradation of the examined road marking. As such, when the examined road marking degrades due to peeling, the accurate determination on the level of degradation of the examined road marking can be achieved.

In the form shown, the reference calculation area includes only an area of the reference road marking, and the target calculation area includes only an area of the examined road marking. As such, accurate determination on the level of degradation of the examined road marking can be achieved.

In the form shown, the plurality of reference color values and the plurality of target color values are in grey values. As such, the complexity in image processing and color comparison can be reduced.

In the form shown, the plurality of shutter speeds includes a first range, a second range and a third range. As such, accurate determination on the level of degradation of the examined road marking can be achieved.

In the form shown, the first range is from 1/200 to 1/800 sec, the second range is from 1/800 to 1/1200 sec, and the third range is from 1/1200 to 1/1800 sec. As such, accurate determination on the level of degradation of the examined road marking can be achieved.

BRIEF DESCRIPTION OF THE DRAWINGS

The present disclosure will become more fully understood from the detailed description given hereinafter and the accompanying drawings which are given by way of illustration only, and thus are not limitative of the present disclosure, and wherein.

Figure 1:
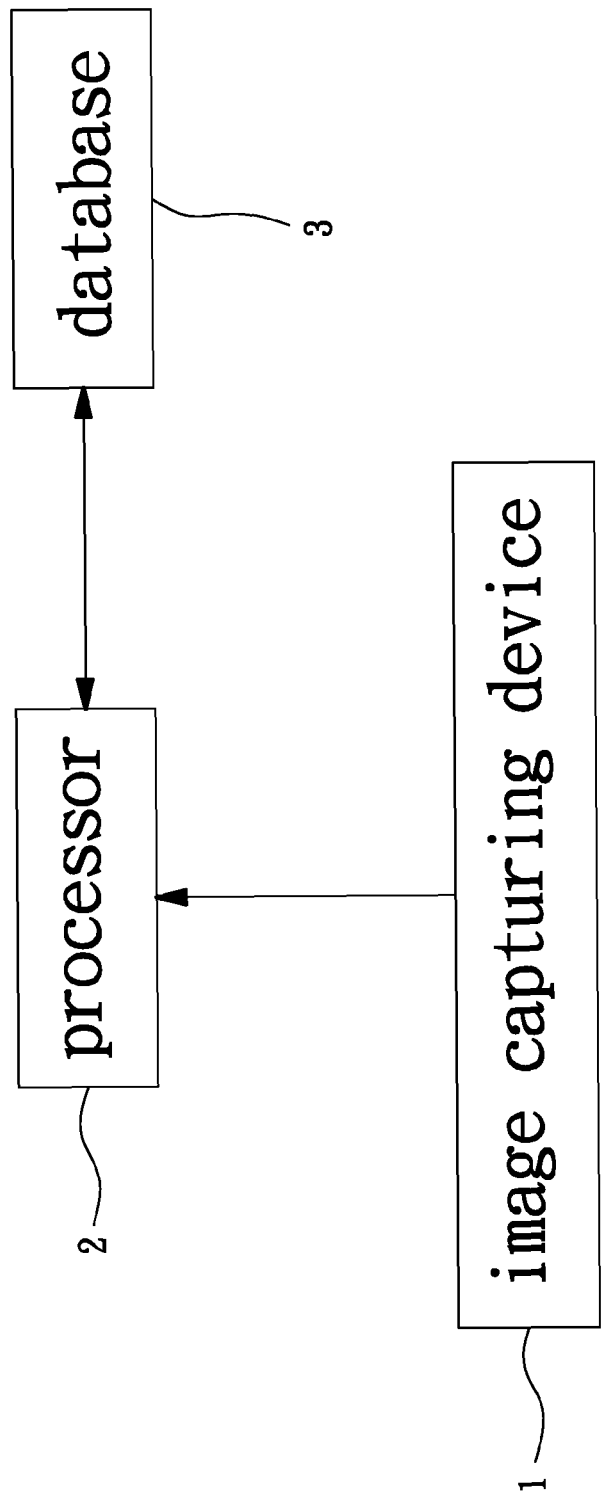
FIG. 1 shows a block diagram of a system used to execute a method for determining the level of degradation of a road marking according to a first embodiment of the disclosure.

In the various figures of the drawings, the same numerals designate the same or similar parts. Furthermore, when the terms "first", "second", "third", "fourth", "inner", "outer", "top", "bottom", "front", "rear" and similar terms are used hereinafter, it should be understood that these terms have reference only to the structure shown in the drawings as it would appear to a person viewing the drawings, and are utilized only to facilitate describing the disclosure.

DETAILED DESCRIPTION OF THE INVENTION

FIG. 1 shows a block diagram of a system used to execute a method for determining the level of degradation of a road marking according to a first embodiment of the disclosure. The system may be a determination unit including an image capturing device 1, a processor 2 and a database 3. The processor 2 is electrically connected to the image capturing device 1 and the database 3.

The image capturing device 1 may be a regular camera or a dashboard camera which is able to capture the images. The image capturing device 1 is provided with a plurality of shutter speeds. When the light intensity of the environment is high, the image capturing device 1 captures an image with a higher shutter speed. When the intensity of the light in the environment is low, the image capturing device 1 captures an image with a lower shutter speed. As such, the image capturing device 1 is able to photograph an object and generates an image accordingly. Specifically, the image capturing device 1 photographs a reference road marking under different light intensities of the environment, and generates a plurality of reference images of the reference road marking accordingly. Namely, the image capturing device 1 generates each of the plurality of reference images by photographing the reference road marking with a corresponding shutter speed. As such, the plurality of reference images is generated in correspondence to the plurality of shutter speeds. The image capturing device 1 also photographs an examined road marking with a shutter speed that is determined according to the light intensity of the environment, and generates an image of the examined road marking accordingly. The examined road marking refers to a road marking which has been in service for a period of time and requires an examination on its current condition in order to determine whether it needs the renovation or not. The image capturing device 1 may detect the light intensity of the environment via a photosensitive element. In this regard, the image capturing device 1 captures the image of the examined road marking with a proper shutter speed based on the light intensity of the environment, so as to properly expose the image under a constant aperture. The detail is not described herein as it can be readily appreciated by the persons having ordinary skill in the art. Furthermore, the image capturing device 1 can be operated in a different manner to capture the image. For instance, the image capturing device 1 may be a regular camera which the user holds for taking a picture, or may be a dashboard camera that is installed on a car for capturing the images of the road markings during the movement of the car.

The plurality of shutter speeds may include different ranges. The time duration of each range may be set according to the user's requirement. In the embodiment, the plurality of shutter speeds includes a first range of 1/200 to 1/800 sec, a second range of 1/800 to 1/1200 sec, and a third range of 1/1200 to 1/1800 sec. In this arrangement, the first range has a higher shutter speed, and the third range has a lower shutter speed. Through the arrangement of the plurality of shutter speeds, the images of the road marking can be captured with the plurality of shutter speeds to generate the plurality of reference images for further comparisons. Thus, accurate determination on the level of degradation of the road marking can be attained.

The processor 2 may be a computer or any calculating device, and is able to execute a software program to perform an image processing function or a calculation function. In the embodiment, the processor 2 is electrically connected to the image capturing device 1 to receive the plurality of reference images or the image of the examined road marking. Then, the processor 2 is able to perform the image processing function to convert the plurality of reference images into a plurality of reference data (or convert the image of the examined road marking into an examined data).

The database 3 is used to store the plurality of reference data corresponding to the plurality of shutter speeds. In the embodiment, the database 3 is electrically connected to the processor 2, so that the processor 2 is able to retrieve the plurality of reference data from the database 3 for further comparison and analysis. The plurality of reference data may be written into the database 3 by the processor 2. Specifically, after the image capturing device 1 photographs the reference road marking to generate the plurality of reference images, the processor 2 can convert the plurality of reference images into the plurality of reference data by performing an image processing function. Then, the processor 2 stores the plurality of reference data in the database 3 for further comparison and analysis.

The method for determining the level of degradation of a road marking according to the first embodiment of the disclosure includes a database creating step, an image capturing step, a shutter speed determination step and a degradation level determination step.

Figure 2A:
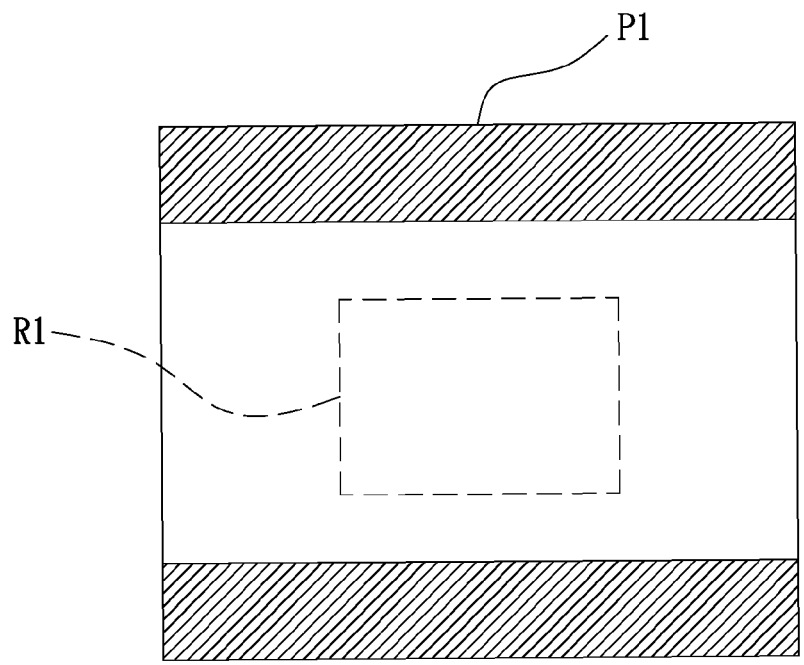
FIG. 2a shows a reference image used in the first embodiment of the disclosure.

Referring to FIG. 2a, the database creating step is configured to generate a plurality of reference images P1 of a reference road marking by the image capturing device 1 photographing the reference road marking with the plurality of shutter speeds. For each of the plurality of reference images P1, the processor 2 selects a reference calculation area R1 from the reference image P1, performs a first image analysis procedure on the reference calculation area R1 to generate the plurality of reference data, and stores the plurality of reference data into the database 3.

Specifically, when the image capturing device 1 photographs the reference road marking on a roadway, the generated reference image P1 may contain other views of the roadway in addition to the reference road marking, such as the plain surface view of the roadway not containing the reference road marking. Due to this, the reference calculation area R1 as selected by the processor 2 may include only the area of the reference road marking. Advantageously, the reference calculation area R1 will not include the area of the plain road surface and will not generate the improper reference data. Thus, accurate determination on the level of degradation of the examined road marking can be ensured.

During the first image analysis procedure, for the reference calculation area R1 in each of the plurality of reference images P1, the processor 2 calculates an average color value of a plurality of pixels of the reference calculation area R1. Thus, the reference calculation areas R1 of the plurality of reference images P1 will have a plurality of average color values. The plurality of average color values is used as a plurality of reference color values being the plurality of reference data. If the reference road marking has only one color and the reference calculation areas R1 includes only the area of the reference road marking, each of the plurality of pixels in the reference calculation areas R1 will have the same color value. In this case, although a minority of the pixels of the reference calculation areas R1 exhibits color distortion due to light distribution or other factors, the average color value of the plurality of pixels of the reference calculation areas R1 will still be close to the actual color of the reference road marking as a majority of the pixels of the reference calculation areas R1 has the correct color value. Thus, the accuracy of the plurality of reference data can be maintained, providing an accurate determination on the level of degradation of the examined road marking.

Furthermore, the reference color value may be any value that can represent a color. In the embodiment, the reference color value may be a grey value in order to reduce the complexity in image processing and color comparison. The conversion of the gray value can be carried out during the first image analysis procedure as executed by the processor 2, as it can be readily appreciated by the persons having ordinary skill in the art.

Figure 2B:
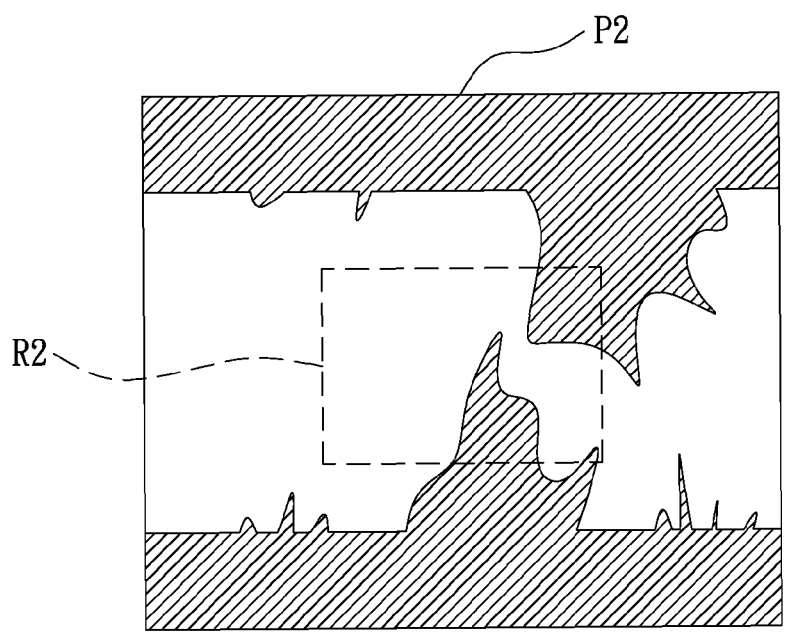
FIG. 2b shows an image of an examined road marking used in the first embodiment of the disclosure.

Referring to FIG. 2b, the image capturing step is configured to select one of the plurality of shutter speeds based on the light intensity of the environment, and to photograph the examined road marking by the image capturing device 1 using the selected shutter speed, thereby generating an image of the examined road marking P2. Then, the processor 2 selects a target calculation area R2 from the image of the examined road marking P2, and performs a second image analysis procedure on the target calculation area R2 to generate an examined data.

Specifically, when the image capturing device 1 photographs the examined road marking on a roadway, the generated image P2 may contain other views of the roadway in addition to the examined road marking, such as the plain surface view of the roadway not containing the examined road marking. Due to this, the target calculation area R2 as selected by the processor 2 may include only the area of the examined road marking. Advantageously, the target calculation area R2 will not include the area of the plain road surface and will not generate the improper examined data. Thus, accurate determination on the level of degradation of the examined road marking can be ensured.

During the second image analysis procedure, for the target calculation area R2 of the image of the examined road marking P2, the processor 2 analyzes the color value of each of a plurality of pixels of the target calculation area R2. Thus, the plurality of pixels of the target calculation area R2 will have a plurality of color values serving as a plurality of target color values. The examined data includes the plurality of target color values. Since the target calculation area R2 includes only the area of the examined road marking, each of the plurality of pixels of the target calculation area R2 will be located in the area of the examined road marking. As such, accurate determination on the level of degradation of the examined road marking can be ensured.

Furthermore, each of the plurality of target color values may be any value that can represent a color. In the embodiment, each of the plurality of target color values may be a grey value in order to reduce the complexity in image processing and color comparison. The conversion of the gray value can be carried out during the second image analysis procedure as executed by the processor 2, as it can be readily appreciated by the persons having ordinary skill in the art.

The shutter speed determination step as executed by the processor 2 is configured to, based on the shutter speed of the examined data, retrieve one of the plurality of reference data from the database 3 which has the corresponding shutter speed.

Specifically, the database 3 stores the plurality of reference data corresponding to the plurality of shutter speeds. Based on this, when the processor 2 needs to compare the examined data with a certain reference data, the processor 2 can retrieve one of the plurality of reference data from the database 3 according to the shutter speed of the examined data. In this manner, the examined data and the reference data will be compared under the same basis (the same shutter speed), thus improving the accuracy in determining the level of degradation of the examined road marking.

The degradation level determination step is executed by the processor 2 to perform a difference determination procedure between the examined data and the reference data. As such, the color difference between the examined data and the reference data can be determined to output a determined result. The difference determination procedure can be carried out in two different ways as discussed below.

In the first embodiment of the disclosure, the processor 2 calculates a color difference between the reference color value and each of the plurality of target color values during the difference determination procedure. As such, a plurality of color differences is generated for the plurality of target color values. Then, the plurality of color differences is added to generate a total difference value, which is divided by the quantity of the plurality of target color values to generate an average difference value. The average difference value is used as the determined result.

For example, the plurality of shutter speeds includes three ranges, and each of the plurality of color values is in a grey value. Assume the reference color value corresponding to the first range (1/200 to 1/800 sec) is 200, the reference color value corresponding to the second range (1/800 to 1/1200) is 215, and the reference color value corresponding to the third range (1/1200 to 1/1800 sec) is 230. In this case, if the processor 2 determines that the shutter speed of the examined data is in the first range, the processor 2 can calculate a color difference between the reference color value (200) and each of the plurality of target color values (the color value of each of the plurality of pixels of the target calculation area R2). As such, a plurality of color differences is generated. Then, the plurality of color differences is added to generate a total difference value, which is divided by the quantity of the plurality of target color values to generate the average difference value. The larger the average difference value the larger the color variation of the target calculation area R2. Since the difference determination procedure can calculate the color difference between the reference color value and each of the plurality of target color values of the target calculation area R2 and can output the average difference value as the determined result, the degree of color fading of the examined road marking can be accurately determined when the examined road marking degrades due to color fading. Thus, accurate determination on the degree of color fading of the examined road marking can be achieved.

In a second embodiment of the disclosure, the processor 2 calculates a color difference between the reference color value and each of the plurality of target color values during the difference determination procedure. As such, a plurality of color differences is generated for the plurality of target color values. Then, the processor 2 determines whether the color difference is larger than a threshold value. Among the plurality of color differences, the processor 2 calculates the quantity of the color differences that are larger than the threshold value, and determines a ratio between said quantity and the quantity of the plurality of target color values for further determination.

Specifically, based on the above three ranges of the plurality of shutter speeds, the processor 2 can set the threshold value (such as 50). In this case, if the processor 2 determines that the shutter speed of the examined data is in the first range, the processor 2 can calculate a color difference between the reference color value (200) and each of the plurality of target color values (the color value of each of the plurality of pixels of the target calculation area R2). As such, a plurality of color differences is generated. Then, the processor 2 determines whether the color difference is larger than the threshold value (the color difference is larger than the threshold value if it is 51). In this regard, among the plurality of color differences, the processor 2 calculates the quantity of the color differences that are larger than the threshold value, and determines a ratio between said quantity and the quantity of the plurality of target color values of the target calculation area R2 for further determination. For instance, if the quantity of the color differences that are larger than the threshold value is 35 and if the quantity of the plurality of target color values is 100, it indicates that 35 out of 100 pixels have a larger color distortion as compared with the reference color value. In this situation, the level of degradation of the examined road marking is 35% within the target calculation area R2. Since the difference determination procedure can calculate the color difference between the reference color value and each of the plurality of target color values of the target calculation area R2 and can determine a ratio between the quantity of the color differences that are larger than the threshold value and the quantity of the plurality of target color values, the determined result may be generated to reflect the degree of peeling when the examined road marking degrades due to peeling. Thus, accurate determination on the degree of peeling of the examined road marking can be achieved.

Moreover, given the above two approaches of the difference determination procedure, the processor 2 can execute one or both of the approaches at the same time. When the processor 2 executes both approaches at the same time, the degrees of color fading and peeling of the examined road marking can be accurately determined.

In summary, the method for determining the level of degradation of a road marking according to the disclosure can choose a proper reference data based on the shutter speed of the examined data, thus providing an accurate determination on the level of degradation of the examined road marking under the same basis (the same shutter speed) of the examined data and the reference data.

Although the disclosure has been described in detail with reference to its presently preferable embodiments, it will be understood by one of ordinary skill in the art that various modifications can be made without departing from the spirit and the scope of the disclosure, as set forth in the appended claims.

What is claimed is:

1. A method for determining a level of degradation of a road marking, as executed by a determination unit comprising a processor, a database, and an image capturing device having a plurality of shutter speeds, wherein the method comprises:

generating a plurality of reference images of a reference road marking by the image capturing device photographing the reference road marking with each of the plurality of shutter speeds;

selecting a reference calculation area from each of the plurality of reference images by the processor;

generating a plurality of reference data by the processor performing a first image analysis procedure on the reference calculation area of each of the plurality of reference images;

storing the plurality of reference data in the database by the processor;

generating an image of an examined road marking by the image capturing device selecting one of the plurality of shutter speeds according to a light intensity of an environment and photographing the examined road marking using the selected shutter speed;

selecting a target calculation area from the image of the examined road marking by the processor;

generating an examined data by the processor performing a second image analysis procedure on the target calculation area of the image of the examined road marking;

retrieving one of the plurality of reference data from the database that has a same one of the plurality of shutter speeds as the selected shutter speed of the examined road marking, as performed by the processor;

determining a color difference between the retrieved reference data and the examined data by the processor performing a difference determination procedure between the retrieved reference data and the examined data; and outputting a determined result of the level of degradation of the examined road marking according to the color difference, wherein the plurality of shutter speeds comprises a first range, a second range and a third range, wherein the first range is from 1/200 to 1/800 sec, the second range is from 1/800 to 1/1200 sec, and the third range is from 1/1200 to 1/1800 sec.

2. The method for determining the level of degradation of the road marking as claimed in claim 1, wherein performing the first image analysis procedure comprises:

calculating an average color value of a plurality of pixels of the reference calculation area by the processor; and defining the average color values of the reference calculation areas of the plurality of reference images as a plurality of reference color values by the processor, wherein the plurality of reference color values is the plurality of reference data.

3. The method for determining the level of degradation of the road marking as claimed in claim 2, wherein performing the second image analysis procedure comprises:

analyzing a color value of each of a plurality of pixels of the target calculation area by the processor; and defining the color values of the plurality of pixels of the target calculation area as a plurality of target color values by the processor, wherein the examined data comprises the plurality of target color values.

4. The method for determining the level of degradation of the road marking as claimed in claim 3, wherein the retrieved reference data corresponds to one of the plurality of reference color values, wherein performing the difference determination procedure comprises:

calculating a color difference between the one of the plurality of reference color values and each of the plurality of target color values by the processor;

generating a total difference value by the processor adding the color differences between the one of the plurality of reference color values and each of the plurality of target color values;

generating an average difference value by the processor dividing the total difference value by a quantity of the plurality of target color values; and defining the average difference value as the determined result of the level of degradation of the examined road marking by the processor.

5. The method for determining the level of degradation of the road marking as claimed in claim 3, wherein the retrieved reference data corresponds to one of the plurality of reference color values, wherein performing the difference determination procedure comprises:

calculating a color difference between the one of the plurality of reference color values and each of the plurality of target color values by the processor;

determining whether the color difference is larger than a threshold value by the processor;

calculating a quantity of the color differences of the plurality of target color values that are larger than the threshold value by the processor; and determining a ratio between the quantity and a quantity of the plurality of target color values by the processor, wherein the ratio is the determined result of the level of degradation of the examined road marking.

6. The method for determining the level of degradation of the road marking as claimed in claim 3, wherein the plurality of reference color values and the plurality of target color values are in grey values.

7. The method for determining the level of degradation of the road marking as claimed in claim 1, wherein the reference calculation area comprises only an area of the reference road marking, and wherein the target calculation area comprises only an area of the examined road marking.

* * * * *